United States Patent [19]

Eguchi

[11] Patent Number: 5,537,122
[45] Date of Patent: Jul. 16, 1996

[54] TRACKING ARRAY ANTENNA SYSTEM

[75] Inventor: Kouichi Eguchi, Mitaka, Japan

[73] Assignee: Japan Radio Co., Ltd., Tokyo, Japan

[21] Appl. No.: 503,731

[22] Filed: Jul. 18, 1995

[30] Foreign Application Priority Data

Jul. 22, 1994 [JP] Japan ................................. 6-171440
Jun. 27, 1995 [JP] Japan ................................. 7-160981

[51] Int. Cl.⁶ ....................................................... H01Q 3/00
[52] U.S. Cl. ....................................................... 342/359
[58] Field of Search ................................. 342/359, 75, 77

[56] References Cited

U.S. PATENT DOCUMENTS

| | | | |
|---|---|---|---|
| 4,418,350 | 11/1983 | Rosen | 342/359 |
| 5,223,845 | 6/1993 | Eguchi . | |
| 5,227,806 | 7/1993 | Eguchi . | |
| 5,241,319 | 8/1993 | Shimizu | 342/359 |
| 5,359,337 | 10/1994 | Eguchi . | |

FOREIGN PATENT DOCUMENTS

| | | |
|---|---|---|
| 0373604 | 6/1990 | European Pat. Off. . |
| 0532332 | 3/1993 | European Pat. Off. . |
| 4-64074 | 2/1992 | Japan . |
| 4-48282 | 2/1992 | Japan . |
| 4-46706 | 4/1992 | Japan . |
| 4-119407 | 4/1992 | Japan . |
| 4-242184 | 8/1992 | Japan . |
| 4-291183 | 10/1992 | Japan . |
| 4-315301 | 11/1992 | Japan . |
| 5-232206 | 9/1993 | Japan . |
| 6-13810 | 1/1994 | Japan . |
| 6-66118 | 9/1994 | Japan . |
| 1056815 | 2/1967 | United Kingdom . |
| 2254511 | 10/1992 | United Kingdom . |

OTHER PUBLICATIONS

"8 Elements Spiral Array Antenna for Mobile Satellite Communications" Electronic Information Communications Society, Nat'l. Spring Convention—1988, B–116, Akio Kuramoto et al.

Primary Examiner—Theodore M. Blum
Attorney, Agent, or Firm—Oliff & Berridge

[57] ABSTRACT

An array antenna system is provided with a function for tracking a target. The system captures the target by first carrying out search control immediately after a power supply is turned on. After capturing the target, the system performs tracking control using a beam switch controller about an azimuth. An output of a rate sensor is filtered by a high-pass filter and then reflected on a tracking signal for the tracking control. It is possible to keep an angular rate of the array antenna around an azimuth axis to nearly 0 even while no signals can be received from the target. Even when signals can be received from the target, a control system is stabilized by feedback of the angular rate.

4 Claims, 4 Drawing Sheets

TRACKING ARRAY ANTENNA SYSTEM

BACKGROUND OF THE INVENTION

1. Field of the Invention

The present invention relates to an array antenna system suited to be mounted on a moving platform such as a vehicle or a ship and provided with a function for tracking a target such as a satellite. Especially, the present invention relates to an array antenna system having a closed-loop antenna tracking system.

2. Description of the Prior Art

The INMARSAT (The International Maritime Satellite Organization) is known as the satellite communication system providing the world-wide mobile satellite communication services. Some other domestic mobile satellite communication systems have also been established.

In many of the mobile satellite communication systems (MSCSs), such as the INMARSAT, a subscriber can access the system using a mobile terminal with a directional antenna system. The directional antenna can be controlled to point to the satellite by an open-loop antenna control system or by a closed-loop tracking system. In the open-loop antenna control system, the direction (bearing angle) of the antenna can be controlled by using the information of the vehicle's direction and the feedback of the antenna bearing angle. For instance, the vehicle's direction is detected by a magnetic compass. However, it is noted that the information of the vehicle's direction from magnetic-compass is sometimes dismissed by the large errors on the vehicle.

On the other hand, the antenna can track the satellite by the receiving signal transmitted from a satellite by the closed-loop antenna tracking system. An example of the closed-loop antenna tracking system has been disclosed in "The 8-Element Spiral Array Antenna for the Mobile Satellite Communications" by Kuramoto et al., 1988 Spring National Meeting of IEICE, B-118. The disclosed antenna tracking system is referred to as the beam-switch antenna tracking (BST) system in azimuth.

In BST antenna system, 1) the antenna beam positions are frequently switched alternatively,
2) the tracking signal (the difference signal) is obtained by comparing with the received level signals (RECLEVs) at the two beam positions, and
3) the antenna is controlled to track the satellite by the tracking signal around the azimuth axis.

The BST antenna system is suitable for tracking the target which transmits the carrier signal continuously under the condition of no blockages in line-of-sight. However, it is not possible to track the satellite by the BST under the conditions of no receiving signals from the target by blockages in line-of-sight.

The number of MSCSs, such as the INMARBAT, which adopt the burst-mode SCPC/TDM carrier system will increase. In general, the TDM (Time Division Multlplexed) carrier is a continuously transmitted carrier broadcasting the channel information to the subscribers for the access and control, and the burst-mode SCPC (Single Channel Per Carrier) carrier is a burst-mode (voice-activated) transmission carrier for voice signal transmission from base-station to subscriber via satellite.

It is also not suitable for the primitive BST to track the satellite by the tracking signal obtained from the burst-mode SCPC carrier.

To solve the problems of closed-loop antenna tracking systems during the intervals of no receiving signal, an hybrid tracking method has been proposed (refer to the Japanese Patent Laid-Open No. Hei 5-232206). In this patent application document, it is suggested that the antenna bearing angle is controlled by using the output of an angular rate-sensor during short intervals of no receiving signal. Though it is not clearly explicit how to use the output of the angular rate-sensor for controlling the antenna bearing angle in the above document, it is supposed that vehicle's turning angle may be estimated at real-time by integrating the output of an angular rate-sensor fixed to the vehicle and the antenna may be controlled to compensate the above estimated turning angle by using the feedback signal of the antenna bearing angle from the potentiometer/encoder of the azimuth axis during no-receiving signal intervals. Therefore, the proposed hybrid tracking method will offer better performances than primitive closed-loop method will under no receiving signal condition. However, the proposed hybrid tracking method seems to have some problems to be overcome. The first problem expected will be caused by the offset voltage of angular rate-sensor output (It is not always easy to cancel the offset voltage because of its drift.). The vehicle's turning angle may be estimated by integrating the output of an angular rate-sensor fixed to the vehicle. However, the large angle error may be generated by the integration of the offset voltage (and its drift) of angular rate-sensor output. It may be possible to avoid a large error due to an offset voltage by adopting a low-drift angular rate-sensor. However, it will be costly to use a low-drift rate-sensor. The second problem expected is that it will be costly to obtain the feedback signal of the antenna bearing angle from the potentiometer/encoder of the azimuth (AZ) axis. The 3rd problem expected is that a time lag (delay) for the control-mode transition (from closed-loop control to open-loop control, or vice versa) is required because the decision of the mode-transition depends on the receiving signal condition and/or a timer and it (time lag) may degrade the tracking performances during mode-transitions.

SUMMARY OF THE INVENTION

It is the first object of the present invention to make it possible to track a target by low-cost hybrid antenna control system (combined a closed-loop antenna tracking with an open-loop antenna control) based upon a beam-switch tracking (BST) and an angular rate-sensor.

It is the second object of the present invention to make it possible to track a target even when a receiving signal is not available intermittently due to blockages or some other reasons by using not only the receiving signal but also output of an angular rate-sensor.

It is the third object of the present invention to make it possible to track a target for relatively longer interval under no receiving signal condition by low-cost open-loop antenna control system.

It is the fourth object of the present invention to make it possible to track a target for relatively longer interval under no receiving signal condition by using a low-cost angular rate-sensor whose output may be accompanied by a large offset voltage and/or whose output may be poor in linearity. As the angular rate-sensor output is passed through the high pass filter (HPF) before delivering in the present invention, then a low-cost angular rate-sensor whose output may be accompanied by a large offset voltage is also available. Furthermore, the angular rate-sensor output is not integrated in the present invention, then a low-cost angular rate-sensor whose output may be poor in linearity to applied angular rate is also available.

It is the fifth object of the present invention to make it possible to track a target by low-cost open-loop antenna control system under no receiving signal condition without a feedback signal of the antenna bearing angle from the potentiometer/encoder of the azimuth axis.

It is the sixth object of the present invention to realize a low-cost hybrid antenna control system without time lag for transition (from closed-loop control to open-loop control, or vice versa). Actually, mode transition control signal is not required in the hybrid tracking system of the present invention because the closed-loop tracking signal and the rate-sensor output (high pass filtered) for open-loop control are always mixed (except for the SEARCH-mode) and the mixed AZ control signal is delivered to an AZ servo amplifier. As a result, no degradation of the tracking performance is expected during the transitions from closed-loop control to open-loop control, or vice versa.

The hybrid antenna control system described above may be called as the BSTARFB (the beam-switch antenna tracking system with an antenna angular-rate feedback) in this application.

A preferable embodiment of the improved hybrid antenna control (BSTARFB) system of the present invention comprises an array antenna with phase shifters, a phase shifter controller, a beam-switch tracking (BST) controller, a receiver, a rate-sensor, a high-pass filter (HPF), an AZ servo amplifier and an AZ motor.

The array antenna is comprised by a plurality of antenna elements and, preferably, at least a couple of variable phase shifters. The antenna beam position of the array antenna is switched frequently between at least 2 beam-positions alternatively by the phase shifters and a phase shifter controller.

The BST controller generates combined AZ motor control signal based upon a BST signal and a high pass filtered rate-sensor output. The BST signal (e.g. a closed-loop tracking signal) is, for example, continuously generated from the difference of the receiving level signals at least 2 beam-positions switched alternatively. The receiving level signal (RECLEV) is a signal corresponding to the electro-magnetic flux-density of the desired carrier frequencies at the array antenna and is, for example, generated by integrating (and dumping) the output signal of a signal detector (e.g. a diode-detector) for the intermediate frequency (IF) signal of the receiver.

The rate-sensor is arranged to detect an angular rate of the antenna around AZ axis. The high pass filtered rate-sensor output is mixed with the above BST signal at the BST controller and is supplied to AZ servo amplifier to stabilize the angular-rate of the antenna. Then, the antenna is maintained its direction for longer intervals even widen the BST tracking signal is extremely noisy.

In addition, the antenna system of the present invention is preferably provided with a SEARCH-mode. The SEARCH-mode may be initiated immediately after the turning the power-supply on or after long absence of the carrier signal from the target.

Furthermore, it is possible for the antenna system of the present invention to adopt a planar phased array antenna which is installed horizontally on the top of a vehicle. In this type of antenna, the antenna beam can be tilted (or controlled) in Elevation (EL). The antenna beam can he tilted (or controlled) in EL by controlling the phase-shift of the phase shifters of the planar phased array antenna.

DESCRIPTION OF THE PREFERRED EMBODIMENTS

Preferred embodiments of the present invention are described below with reference to the accompanying drawings.

(a) Appearance of first embodiment

Figure 1A:
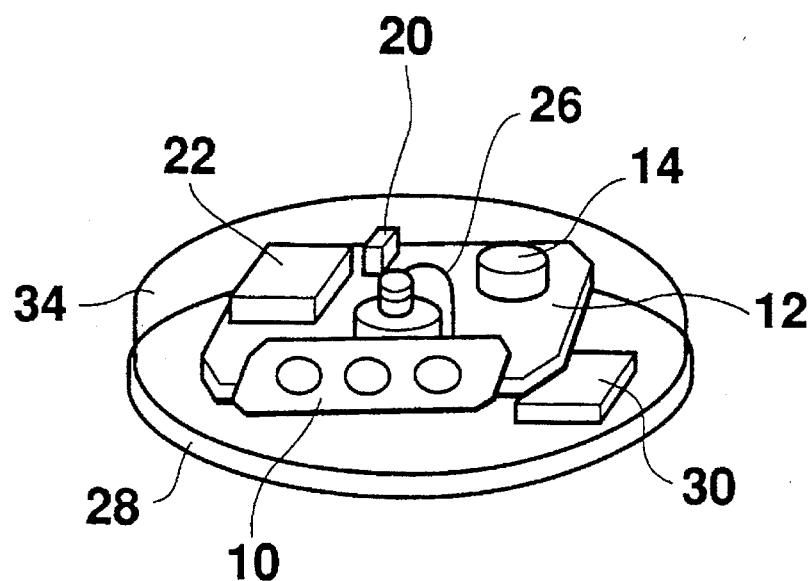
FIG. 1A is a perspective view showing the appearance of the tracking array antenna system of the first embodiment of the present invention.
Figure 1B:
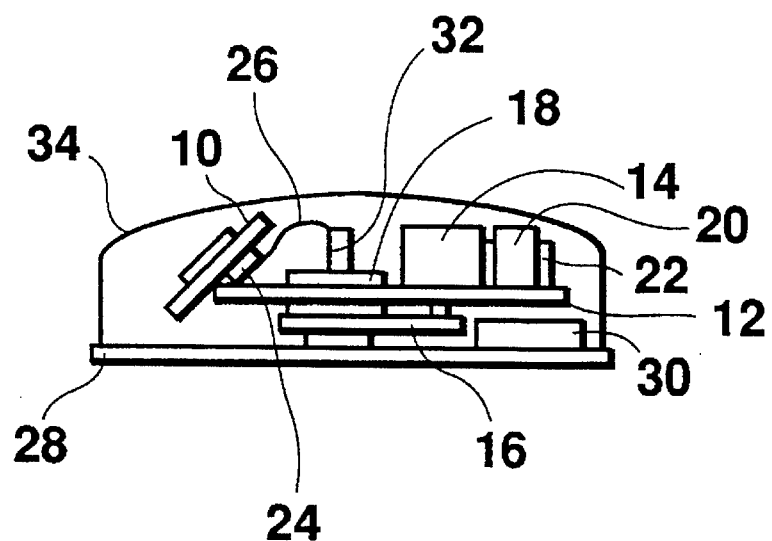
FIG. 1B is a side view showing the appearance of the first embodiment.

FIGS. 1A and 1B show the appearance of the tracking antenna system of the first embodiment of the present invention. In this embodiment, an array antenna 10 is fixed onto a turntable 12. The array antenna 10 has a structure in which three elements are arranged in a row around an AZ axis 18.

Moreover, an AZ-axis motor 14 is arranged on the turntable 12. The output axis of the AZ-axis motor 14 is connected to the AZ-axis 18 through a belt 16. The AZ axis 18 supports the turntable 12 so that the turntable 12 can rotate there around. Therefore, when the AZ-axis motor 14 operates, the turntable 12 and also the array antenna 10 rotate around the AZ axis 18. To mount the system of this embodiment on a moving platform such as a vehicle, the turntable 12 is constituted so that it can freely rotate over a wide angle around the AZ axis 18 in order to follow a sharp or high-speed turning of the moving platform.

Moreover, a rate sensor 20 and an antenna controller 22 are arranged on the turntable 12. The rate sensor 20 is used to carry out ARFB to be described later. The rate sensor 20 detects an angular rate applied to the antenna 10 around the AZ axis 18 and supplies the detected result to the antenna controller 22. For carrying out BST to be described later, the antenna controller 22 (i) detects a receiving level while alternately switching the beam direction of the array antenna 10 around the AZ axis 18, (ii) controls the AZ-axis motor 14 so as to track a target in accordance with the detected level, and (iii) thereby steers the array antenna 10 around the AZ axis 18. To implement this function, the array antenna 10 is provided with a predetermined number of variable phase shifters 24 (this embodiment uses two variable phase shifters as described later). To carry out ZRC to be described later, the antenna controller 22 (i) removes an offset voltage from an output of the rate sensor 20, (ii) thereafter controls the AZ-axis motor 14 in accordance with the signal from which the offset voltage has been removed, and (iii) thereby makes an angular rate of the array antenna 10 around the AZ axis 18 approach as close as possible to 0.

The array antenna 10 is connected to a receiver front-end 30. The receiver front-end 30 is arranged on a radome base 28. A signal received by the array antenna 10 is, for example, amplified and frequency-controlled by an amplifier built in the receiver front-end 30. Because the array antenna 10 is arranged on the turntable 12 which rotates around the AZ axis 18 as described above, a coaxial cable 28 is extended to the receiver front-end 30 side by using a rotary connector 32. The radome base 28 constitutes the bottom of a radome 34 for protecting these structures from rain, snow, wind, and dust.

(b) Array antenna of first embodiment

Figure 2:
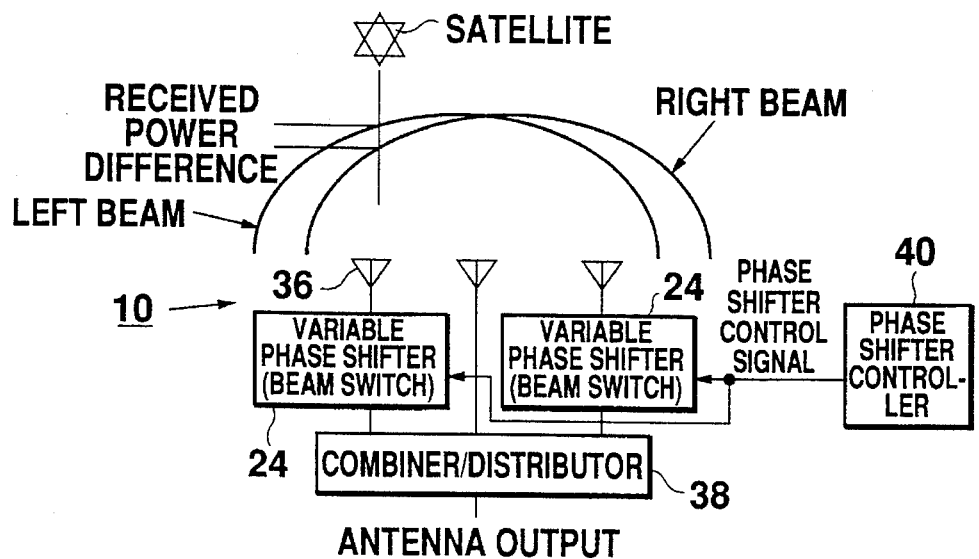
FIG. 2 is an illustration showing the circuit structure of the array antenna of the first embodiment.

FIG. 2 shows the structure and function of the array antenna 10 of this embodiment. The array antenna 10 has three elements 36, as shown in FIG. 1A and 1B, which are arranged at equal distance. This embodiment makes it possible to prevent a so-called phase jump because the variable phase shifter 24 is correlated with two elements 36 respectively located symmetrically to the right-and-left of the phase center of the antenna, respectively. Two variable phase shifters 24 shown in FIGS. 1A, 1B, and 2 can be controlled by a one-bit control signal. Moreover, these variable phase shifters 24 are arranged corresponding to two elements 36 other than the central element 36, that is, two elements 36 located symmetrically at positions to the right-and-left of the central element 38. During transmission, a signal supplied from a not-illustrated circuit, for example, a high power amplifier (HPA) is supplied to each element 36 through a combiner/distributor 38 (and the variable phase shifter 24). During reception, a signal received by each element 36 is supplied to the receiver front-end 30 through the combiner/distributor 38 (and the variable phase shifter 24).

The variable phase shifter 24 is controlled by a phase-shifter controller 40. The phase-shifter controller 40 is built in to the antenna controller 40 or attached to the array antenna 10. The phase-shifter controller 40 generates a phase-shift control signal and supplies it to each variable phase shifter 24. In this case, the phase-shifter controller 40 alternately switches the phase-shifter control signal from 1 to 0 and from 0 to 1 at predetermined time intervals.

When the above phase-shifter control signal is supplied to each variable phase shifter 24, the phase shifts by two variable phase shifters 24 are mutually reciprocally switched. Therefore, an antenna beam formed by three elements 36 is alternately switched from the "right beam" go the "left beam" and vice versa as shown in FIG. 2. In this embodiment, the right and left beams are set so that the receiving antenna gain at the intersection between the antenna patterns of both beams is approx. 0.3 dB lower than the maximum receiving antenna gain of them. As a result, except for the intersection of the beams, a difference occurs between the receiving levels which are obtained by using the right and left beams, respectively, even when the same signal is received from the target (e.g. satellite). Therefore, by comparing the receiving levels before and after alternately switching the phase-shifter control signal, it is possible to determine a direction in which the array antenna 10 should be steered around the AZ axis 18 in order to raise the receiving level.

When the variable phase shifter 24 composed by using semiconductor devices, it is possible to decrease the period for alternately switching the phase-shift to a short time such as approx. 1 μsec. That is, it is possible to realize a high-speed BST in which deterioration of the channel equality does not matter for most purposes even though BST is carried out.

(c) Controller of first embodiment

Figure 3:
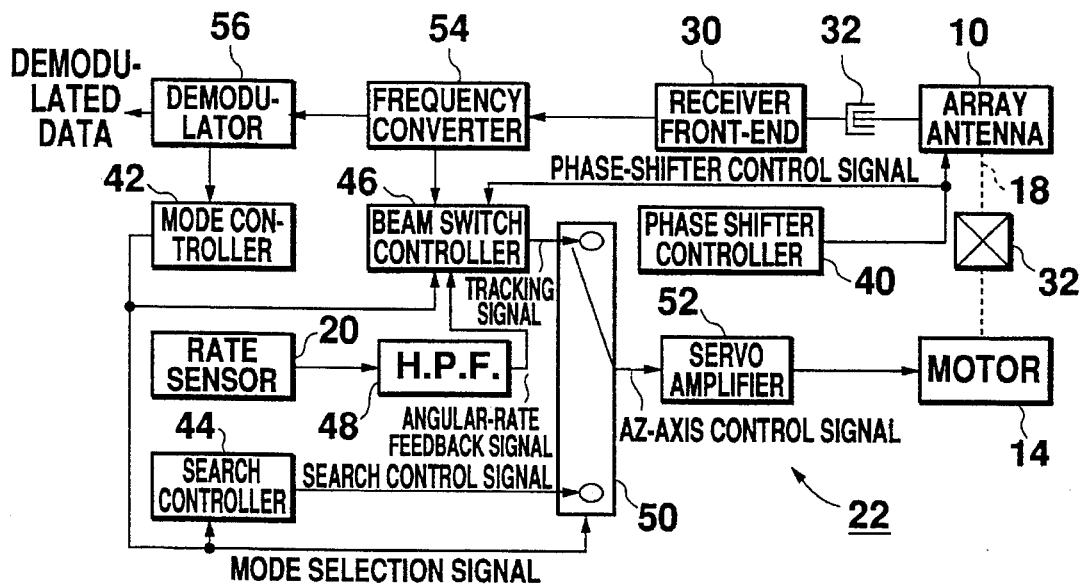
FIG. 3 is a block diagram showing the structure of the antenna controller of the first embodiment.

FIG. 3 shows functional structures of the antenna controller 22 and the like of this embodiment. As shown in FIG. 3, the antenna controller 22 comprises a mode controller 42, a search controller 44, a beam switch controller 46, an HPF 48, a mode switch 50, and a servo amplifier 52. Moreover, a frequency converter 54 and a demodulator 56 are provided at the rear stage of the receiver front-end 30.

The frequency converter 54 converts a received signal outputted from the receiver front-end 30 to an intermediate frequency signal. The demodulator 58 demodulates received data or the like synchronously with the intermediate frequency signal thus obtained and supplies the obtained demodulated data to a not-illustrated circuit. The mode controller 42 receives signals showing a receiving condition such as a synchronization detection signal (SYNCHRO signal) and a receiving level signal and detects the receiving condition of the received signal from a target using the array antenna 10. The mode controller 42 activates the search controller 44 while the array antenna 10 is not capturing a target, e.g. immediately after turning on a power supply (search mode). When the array antenna 10 is capturing a target and when the signal from the target is temporarily stopped or blocked due to burst transmission or blocking, the mode controller 42 activates the beam switch controller 46 (tracking mode). To switch the control mode between these modes, the mode controller 42 generates a mode selection signal In accordance with the receiving condition detected from the receiving level signal. The mode selection signal is supplied to the search controller 44, beam switch controller 46, and mode switch 50. The servo amplifier 52 drives the AZ-axis motor 14 in accordance with a signal ("AZ-axis control signal" in FIG. 3) supplied from the search controller 44 or beam switch controller 48 through the mode switch 50.

(d) Operations of first embodiment

Operations of this embodiment will now be described below.

Immediately after the power supply is turned on, the mode controller 42 first outputs a mode selection signal for commanding search control. The search controller 44 outputs a search control signal in accordance with the mode selection signal and the mode switch 50 is switched so that the search control signal is supplied as the AZ-axis control signal to the servo amplifier 52. The search control signal is a signal for commanding the array antenna 10 to be forcibly or semiforcibly steered around the AZ axis 18 and also has a value corresponding to a receiving condition determined in accordance with a synchronization detection signal or a receiving level signal. When the AZ-axis motor 14 is driven in accordance with a search control signal, the array antenna 10 rotates around the AZ axis 18. Strictly speaking, while search control is being carried out, a beam around the AZ axis 18 is alternately switched from the right beam to left beam and vice versa, in absolute terms, by the phase-shifter controller 40. Therefore, the above search control signal includes component which is representative of an AZ angle error of the array antenna 10. When the array antenna 10 captures a target at any point in time during rotation around AZ-axis 18, a synchronization detection signal and a receiving level signal represent a preferable receiving condition. Therefore, the mode controller 42 recognizes that a target is captured by the array antenna 10 when the synchronization detection signal or receiving level signal represent a preferable receiving state. Corresponding to the fact that it is recognized that the target is captured by the array antenna 10, the mode controller 42 switches the contents of a mode selection signal from a search control commanding to a BST command in order to start the BSTARFB using the latest azimuth of the array antenna 10 as a starting point.

When a mode selection signal for commanding BSTARFB is outputted from the mode controller 42, a tracking signal is outputted from the beam-switch controller 48 in response to the mode selection signal, and the mode switch 50 is switched so as to supply the tracking signal as the AZ-axis control signal to the servo amplifier 52. The tracking signal outputted from the beam switch controller 46 represents a tracking error of the array antenna 10, that is, an error of an AZ angle of the array antenna 10 from that of the target. When the tracking signal is supplied to the servo amplifier 52, the array antenna 10 rotates around the AZ axis 18 so that the tracking error is compensated.

The beam-switch controller 46 generates the tracking signal in accordance with a phase-shifter control signal from the phase shifter controller 40 and an intermediate frequency signal from the frequency converter 54. That is, the beam switch controller 46 detects the intermediate frequency signal and charges (=integrates) the detected signal analogously or digitally for a half cycle of alternate switching of the phase-shifter control signal. Because the integrated value is discharged synchronously at the end of the half cycle of alternate switching of the phase-shifter control signal, an integrated value immediately before discharge represents a receiving level for the last half cycle of a left or right beam used. The beam-switch controller 46 computes a difference between the receiving levels for the right beam period and the left beam period and generates a tracking signal in accordance with the difference. Therefore, the AZ ankle of the array antenna 10 is theoretically controlled by the beam switch controller 46 in an intermediate direction between the right beam direction and the left beam direction.

Figure 4:
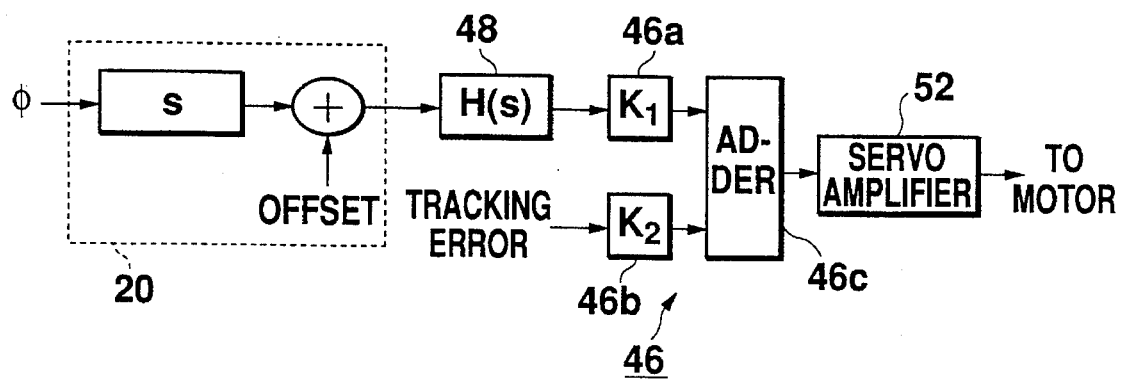
FIG. 4 is a block diagram showing the transmission function of the motor servo system of the first embodiment.

However, the tracking signal generated as described above does not directly serve as an AZ-axis control signal. That is, to generate a tracking signal, the beam switch controller 46 further combines an angular rate signal supplied through the HPF 48 from the rate sensor 20 with the tracking signal. As shown in FIG. 4, for example, the switch beam controller 46 generates a tracking signal by multiplying an angular rate signal and a tracking signal by coefficients K1 and K2 respectively, using built-in multipliers 46a and 46b (amplitude adjustment) and thereafter by adding both signals using a built-in adder 46c. Therefore, in the case of this embodiment, the control system of the AZ axis 32 is stable because the ARFB component is contained in arm AZ-axis tracking signal in the tracking mode.

Moreover, the rate sensor 20, HPF 48, and beam switch controller 46 have the transmission function shown in FIG. 4. As shown in FIG. 4, the rate sensor 20 detects an angular rate of the array antenna 10 and the transfer function of the rate sensor 20 is simply represented as "0". The rate sensor 20 is accompanied with an offset voltage. Because the rate sensor 20 has the offset, if an angular rate detected by the rate sensor 10 is directly used for the control of an angular rate of the array antenna 10 around the AZ axis, the angular rate of the array antenna 10 is controlled to a value equivalent to the offset even if the actual angular rate is 0. The HPF 48, whose transmission function is represented as H(s) in FIG. 4, removes the offset of the rate sensor 20. Therefore, by feeding an output of the HPF 48 back to the tracking control related to the AZ axis 32, the above problem can be avoided when carrying out BSTARFB or ZRC, which will be mentioned later.

When, in tracking mode, a signal from a target falls absent due to burst transmission or blocking, an output of the beam switch controller 46 substantially results in only the ARFB component. Therefore, under the above condition, ZRC is carried out for the AZ axis 32. During ZRC tracking, the AZ angle of the array antenna 10 is kept at an AZ angle immediately before the signal from the target falls absent. Unless signals such as a synchronization detection signal (or SYNCHRO signal) or a receiving level signal are recovered, even if a predetermined time elapses after this control is started, the mode controller 42 generates a mode control signal for commanding the search mode.

Therefore, this embodiment makes it possible to track a target even while the signal from a target is intermittently received because BSTARFB is carried out while the signal from the target is received by the array antenna 10 and ZRC is still operating while no signals from the target are received. Moreover, because the high-pass filtered sensor output is always (except the search mode) fed back, it is unnecessary to determine whether a signal from a target can be used for tracking or not. Therefore, a delay due to the determination does not occur. Furthermore, because the rate sensor 20 is used in place of a magnetic compass and an angular rate of the array antenna 10 around the AZ axis 18 is controlled on the basis of the high-pass filtered output the rarest sensor 20, the integration of the sensor output can be avoided and the linearity required for the rate sensor 20 is moderated. Furthermore, because the offset of the rate sensor 20 is removed by the HPF 48, the rate sensor, having relatively large offset or its drift, can be used as the rate sensor 20 and, therefore, an inexpensive rate sensor can be used as the rate sensor 20. Though the above description does not deal with the antenna beam of an array antenna at EL, it is possible to set the directivity of EL in accordance with an angle of attaching to the turntable 12.

(e) Second embodiment

The second embodiment of the present invention is described below. Any components similar or corresponding to those of the first embodiment are provided with the same symbol and the description thereof is omitted.

Figure 5A:
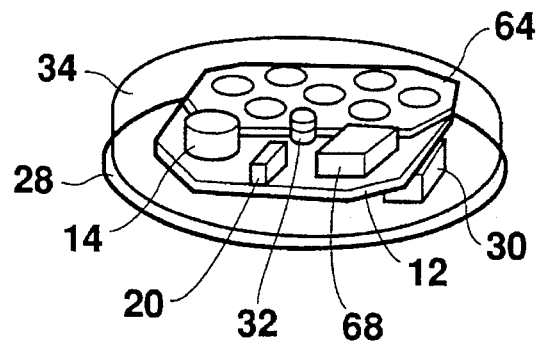
FIG. 5A is a perspective view showing the appearance of the tracking array antenna of the second embodiment of the present invention.
Figure 5B:
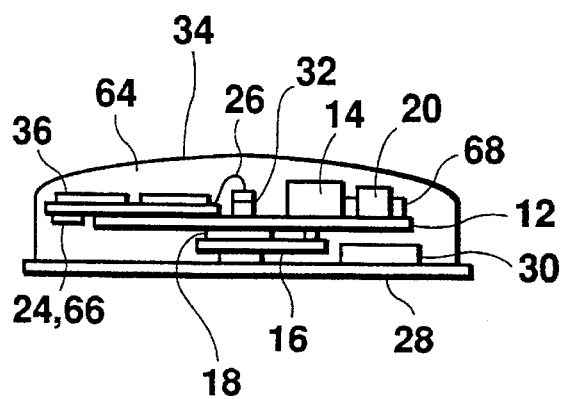
FIG. 5B is a side view showing the appearance of the second embodiment.

FIGS. 5A and 5B show appearances of the second embodiment. This embodiment uses an array antenna 64 having a seven-element offset arrangement. The seven-element offset arrangement is an arrangement in which (i) two elements 36 are arranged on the top row, three elements 36 are arranged on the middle row, and two elements 36 are arranged on the bottom row (total of seven elements) at equal distance in respective rows and (ii) elements 36 included in adjacent rows are offset in the row extending direction so that the distance between adjacent rows decreases. Moreover, a beam-switch variable phase shifter 24 and a variable phase shifter 66 for EL control are arranged on the back of the array antenna 64. In FIGS. 5A and 5B, symbol 68 represents an antenna controller.

Figure 6:
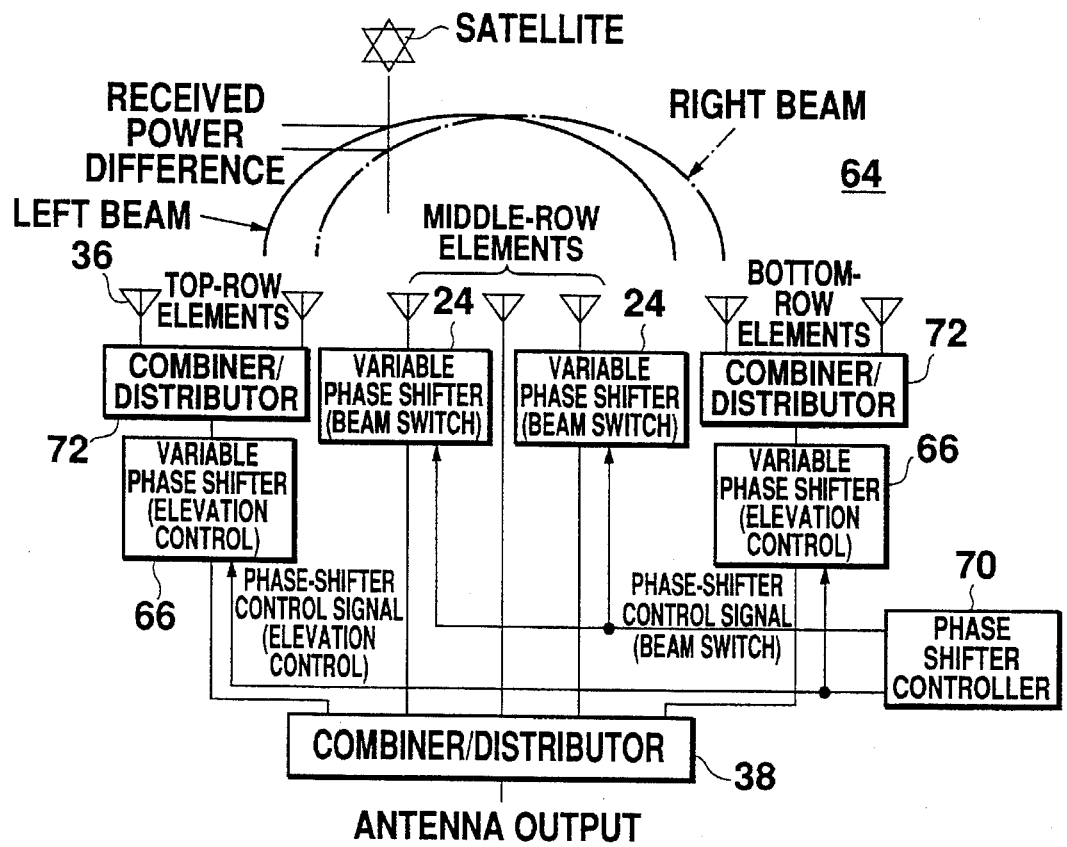
FIG. 6 is an illustration showing the circuit structure of the array antenna of the second embodiment.

FIG. 6 shows the structure of the array antenna 64 of this embodiment. In this embodiment, (i) the elements 36 included in the middle row are provided with the variable phase shifters 24 similarly to the case of the first embodiment and the antenna beam direction around the AZ axis 18 is switched between right and left beams by a phase-shifter controller 70 and (ii) the elements 36 in the top and bottom rows are provided with combiner/distributors 72 for respective rows. The antenna beam direction of the array antenna 64 at elevation is controlled by phase shifters 66 that are controlled by the control signals supplied from the phase-shifter controller 70. It Is also possible to use fixed phase shifters instead of the variable phase shifters 66 so that a fixed beam at the elevation is obtained.

Figure 7:
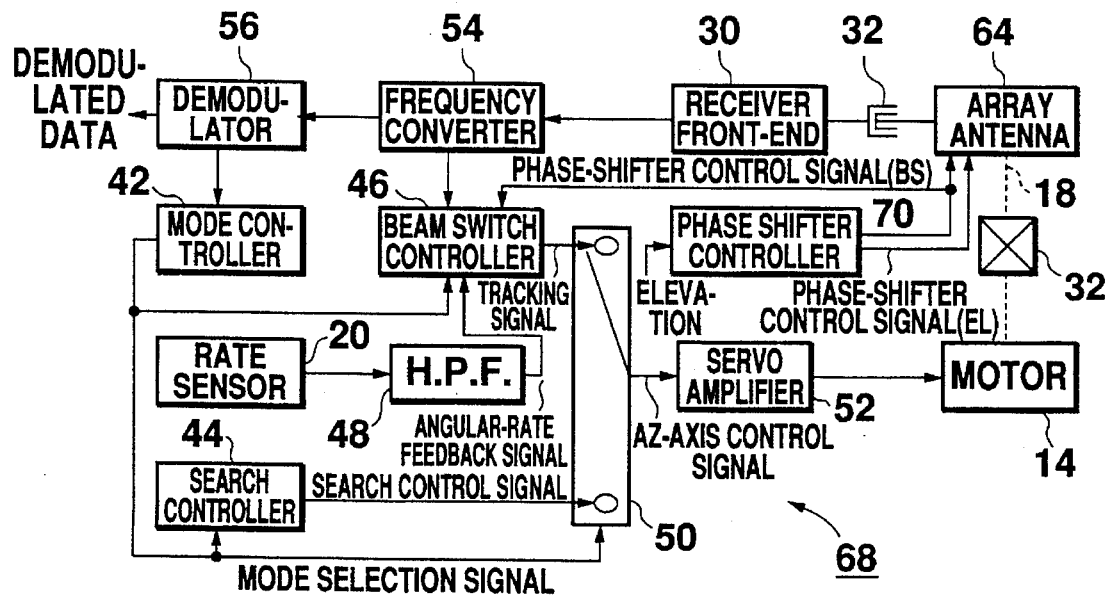
FIG. 7 is a block diagram showing the structure of the antenna controller of the second embodiment.

FIG. 7 shows the structure of the antenna controller 68 of this embodiment. The antenna controller 68 of this embodiment is obtained by modifying the antenna controller 22 shown in FIG. 3 in accordance with FIG. 6. It is possible to use the components as those in the first embodiment, except those of the EL control.

(f) Supplement

In the above description, INMARSAT is taken as an example. However, this is only an example. The present invention can also be implemented as the tracking array antenna system application to the other systems. Though a satellite is shown as an example of a tracking target, the present invention can also be applied to the tracking of a target other than a satellite. In the above description, it is not described in detail how the phase-shifter controller 40 or 70 generates a phase-shifter control signal. However, this will be apparent for persons skilled in the art in view of the disclosed matters of the present invention. For example, it is possible to generate a phase-shifter control signal from the demodulator 56 (that is, it is possible to realize at least part of the phase-shifter controller 40 or 70 using the modulator 56). Thus, even when the present invention is applied to high-speed data-rate communication in which received data that are missing due to the transients of beam-switch becomes an issue, it is possible to generate a phase-shifter control signal so that the data missing does not occur, or the data missing is kept to a small scale. Moreover, in the above description, a plurality of variable phase shifters 24 are correlated with a plurality of elements at positions symmetrically to the right-and-left of a straight line passing through the central element and perpendicular to a row or column. However, it is not always necessary that the elements are at positions symmetrically to the right-and-left of the straight line. Furthermore, the present invention may be embodied as the structure which has a receiver for tracking in addition to the receiver for communication. The receiver for tracking receives the continuous carrier and its output is used to control the tracking operation in accordance with the present invention. Although the size increases since the receiver for tracking is used in addition to the receiver for communication, in this embodiment, the tracking array antenna system having higher reliability is obtained. Namely, the embodiment having the receiver for tracking enables to track the target even when the C/N (carrier power to noise power ratio) is poor. Finally, combining of the respective embodiments of the present invention so that the objects and advantages are not lost will be easy for persons skilled in the art in view of the disclosed contents of the present invention. In addition, it will be apparent for persons skilled in the art to modify the embodiments by incorporating other well-known process such as amplification of a signal.

What is claimed is:

1. An array antenna system comprising:

an array antenna which is steerable around an azimuth axis and is switchable between at least two beam positions around the azimuth axis;

a rate sensor for generating an angular rate signal by detecting an angular rate applied to the array antenna around the azimuth axis;

a high-pass filter for generating an offset-removed angular rate signal by removing low-frequency components from the angular rate signal;

beam switch tracking means, with angular-rate feedback, for generating a tracking signal to track a target by the array antenna in accordance with not only receiving levels before and after alternately switching a beam position of the array antenna around the azimuth axis but also the offset-removed angular rate signal; and driving means for steering the array antenna around the azimuth axis in accordance with the tracking signal;

wherein the tracking signal is generated so that a receiving level, being representative of a carrier-power-to-noise-power ratio of a received signal from a target is further improved after the array antenna has been steered around the azimuth axis in accordance with the tracking signal while the received signal is capable of being used and so that a value of the offset-removed angular rate signal approaches 0 after the array antenna has been steered around the azimuth axis in accordance with the tracking signal while the received signal is not capable of being used.

2. The array antenna system according to claim 1, wherein the array antenna comprises a plurality of antenna elements and variable phase shifters which are arranged corresponding to at least two of the antenna elements respectively and phase-shift signals related to corresponding antenna element in accordance with a phase-shifter control signal, and the beam-switch tracking means comprises means for supplying the phase-shifter control signal to each variable phase shifter so that the beam position of the array antenna is alternately switched around the azimuth axis.

3. The array antenna system according to claim 1, wherein the array antenna comprises:

a plurality of antenna elements arranged around an azimuth axis and divided into a plurality of rows or columns;

beam-switching variable phase shifters which are arranged corresponding to at least two antenna elements in at least one of the plurality of rows or columns and which phase-shift signals related to corresponding antenna elements in accordance with a beam-switching phase-shifter control signal;

and an elevation phase shifter which is arranged corresponding to at least one of the plurality of rows or columns and phase-shifts a signal related to a corresponding row or column; and beam-switch tracking means comprises means for supplying a beam-switching phase shifter control signal to each beam-switching variable phase shifter so that the beam position of the array antenna is alternately switched around the azimuth axis.

4. The array antenna system according to claims 3, wherein the elevation phase shifters are phase shifters for phase-shifting the signal related to the corresponding row or column in accordance with an elevation phase-shifter control signals, and the array antenna system further comprises means for supplying the elevation phase-shifter control signals to the elevation phase shifters so that the receiving level of the signal from the target is further improved.

* * * * *